United States Patent [19] — Cross et al.

[11] 3,710,012

[45] Jan. 9, 1973

[54] COLOR IMAGE DISPLAY SYSTEM

[75] Inventors: Donald John Cross, Tonawanda; Robert Roy Eckenbrecht, East Bethany; Arthur Burke Price, Byron; Benton Boyd Scott, Batavia, all of N.Y.

[73] Assignee: Sylvania Electric Products Inc.

[22] Filed: Dec. 30, 1968

[21] Appl. No.: 787,962

[52] U.S. Cl. ....................................178/5.2, 310/74

[51] Int. Cl. ...........................H04h 9/02, H04h 9/14

[58] Field of Search .......178/6.6, 5.2, 69.5; 352/191, 352/194, 195; 226/61, 62, 17

[56] References Cited

UNITED STATES PATENTS

| | | | |
|---|---|---|---|
| 3,270,131 | 8/1966 | Dinter | 178/6.6 A |
| 2,842,617 | 7/1958 | Turkheimer | 178/69.5 |
| 3,441,186 | 4/1969 | Good | 226/62 |
| 3,351,253 | 11/1967 | Nemeth | 226/13 |
| 3,369,286 | 2/1968 | Marshall | 29/235 |

*Primary Examiner*—Robert L. Griffin
*Assistant Examiner*—Barry L. Leibowitz
*Attorney*—Norman J. O'Malley, Cyril A. Krenzer and Thomas H. Buffton

[57] ABSTRACT

A system for providing a color image display derived from color television signals and photographic film includes a color image reproducer; first signal source means responsive to color television signals to provide signals representative of luminance, chrominance and synchronizing information; second signal source means responsive to light-scanned photographic film to provide signals representative of luminance and chrominance information; transport means for effecting conveyance of a film through said second signal source means and synchronization of said film conveyance and said first signal source means; and switching means for selective coupling of signals representative of luminance and chrominance information from said first and second signal source means to said color image reproducer.

7 Claims, 7 Drawing Figures

INVENTORS
DONALD J. CROSS,
ROBERT R. ECKENBRECHT,
ARTHUR B. PRICE &
BENTON B. SCOTT
BY Cyril A. Krenzer
ATTORNEY INVENTORS
DONALD J. CROSS,
ROBERT R. ECKENBRECHT,
ARTHUR B. PRICE &
BENTON B. SCOTT
BY Cyril A. Krenzer
ATTORNEY INVENTORS
DONALD J. CROSS,
ROBERT R. ECKENBRECHT,
ARTHUR B. PRICE &
BENTON B. SCOTT
BY Cyril A. Kunzer
ATTORNEY

COLOR IMAGE DISPLAY SYSTEM

CROSS REFERENCE TO OTHER APPLICATIONS

Copending application Ser. No. 657,623, filed Aug. 1, 1967, now Patent No. 3,553,352 entitled "Color Reproduction System" relates to apparatus for selectively applying signals from a first and second signal source to a color image reproducer to effect a color image display derived from received signals and film. Also, co-pending application Ser. No. 758,908, filed Sept. 10, 1968, now U.S. Pat. No. 3,548,081 entitled "-Visual Display System" and assigned to the Assignee of the present application relates to apparatus which includes an image reproducer, first and second signal sources, and a switching means and adapter for selective direct coupling of signals from the first and second signal sources to the reproducer.

BACKGROUND OF THE INVENTION

Generally, color image display systems are best known in the form of a color television camera and transmitter in conjunction with a color television receiver. In the usual manner, the color television camera employs an image storage device such as a vidicon to provide color television signals derived from a viewed scene or from photographic films. In turn, the color television signals are transmitted, intercepted, and processed by a color television receiver to provide a color image display.

Unfortunately, apparatus necessary to the above-mentioned color image display systems is of the so-called "commercial" rather than "consumer" type. Obviously, "commercial" type apparatus is not readily available to a consumer, is usually relatively expensive and complex, and is neither operable, available or particularly applicable to the provision of a color image display by an untrained viewer. Thus, it is highly unlikely that an average consumer desirous of providing a color image display from film, such as a home movie film, would invest in the apparatus available and the training necessary to provide such a display.

Other known forms of color image display systems include a flying spot scanner system wherein a flying spot scanner tube in conjunction with photographic film and a projector are employed to provide a color image display. Therein, film conveyed by the projector is light scanned by the flying spot scanner tube to provide signals which are applied to a color image reproducer.

Although such systems have received widespread acceptance in some areas, general TV studio use is one area wherein such systems have been found somewhat lacking in operational achievement. More specifically, the above-mentioned flying spot scanner system is suitable for providing a color image display from photographic film but includes no provision whatever for providing a color image display derived from color television signals as would be required in a consumer product.

Also, the above-mentioned flying spot scanner system requires some form of apparatus for immobilizing a photographic film insofar as a viewer is concerned. In other words, continuously moving or shifting film frames, such as a movie film, must appear as a single viewed slide in order to prevent undesired movement and blurring of the color image display.

One known form of immobilization apparatus employed with flying spot scanner systems is a continuous motion type of projector. Therein, a moving prism or lens system operates in conjunction with a continuous motion of the photographic film to provide a gradual disappearance of one scene and replacement thereof by another scene in a so-called lap-dissolve system.

Although such systems for film immobilization have been employed in so-called "commercial" type apparatus, it has been found that such systems are relatively expensive and employ different optical paths to derive successive frame images. This employment of differing optical paths has, thus far, been found prohibitive to a "consumer" type product because of excessive cost and the degree of perfection required of the optical apparatus.

Another known system for providing a color image display derived from photographic film is the so-called intermittent pull-down system. Herein, each one of a plurality of photographic film frames is scanned by a light beam while in the same physical location. These film frames scanned by the light beam in association with photomultiplier and cooperative processing stages provide color signals which are applied to a color image reproducer having an electron beam trace period during which a color image display observable by a viewer is provided and an electron beam retrace period during which time the color image reproducer is blanked providing no image display observable by a viewer.

In order to effect immobilization of a photographic film in such an intermittent pull-down type system, it has been found that vertical movement of the film must be effected in a manner such that the scan or trace period of the electron beam of a color image reproducer is substantially unaffected insofar as a viewer is concerned. In other words, vertical movement of the photographic film must be hidden from or unobservable to a viewer of the color image reproducer and any one of a number of techniques may be employed. Moreover, such techniques as vertical overscanning of the color image reproducer, vertical scan correction and increased film pull-down speed are applicable and appropriate systems for hiding such movement.

OBJECTS AND SUMMARY OF THE INVENTION

An object of the present invention is to provide an enhanced color image display system. Another object of the invention is to provide an improved system for displaying images derived from photographic films and from color television signals. Still another object of the present invention is to synchronize the conveyance of a photographic film through a flying spot scanner system and the electron beam scanning of a color image reproducer.

These and other objects are achieved in one aspect of the invention by a color image display system which includes a first source of signals responsive to color television signals, a second source of signals responsive to light scanned photographic film, a color image reproducer, switching means for selectively applying signals to the color image reproducer from the first and second signal sources, and transport means for effecting conveyance of the photographic film through the second source of signals and synchronization of the film movement with electron beam scanning of a color image reproducer.

DESCRIPTION OF THE PREFERRED EMBODIMENT

The present invention, together with other and further objects, advantages and capabilities thereof will be best understood when considered in conjunction with the following disclosure, appended claims, and accompanying drawings.

Figure 1:
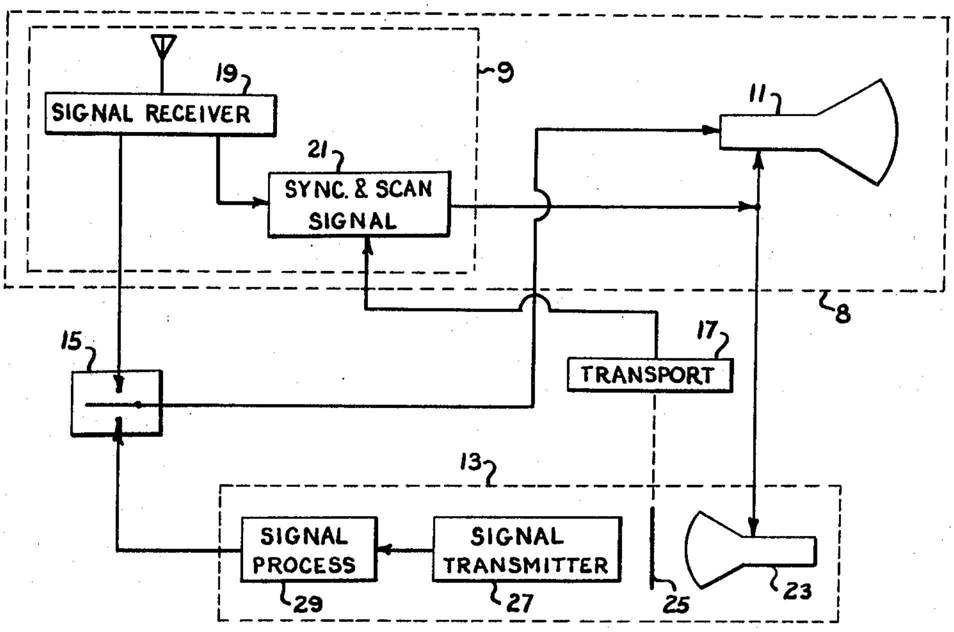
FIG. 1 is a diagrammatic illustration, in block form, of one embodiment of a color image display system.

Referring to the drawings, FIG. 1 illustrates a color image display system including a color television receiver 8 having a first source of signals 9 and a color image reproducer 11 and a second source of signals 13 in the form of a flying spot scanner system. The first and second signal sources 9 and 13 are connected to a switching means 15 for selective coupling of signals therefrom to the color image reproducer 11. Also, the first and second signal sources 9 and 13 are intercoupled by a transport means 17 for effecting conveyance of a photographic film through the second signal source 13 and synchronization of the first and second signal sources 9 and 13.

The first signal source 9 includes a signal receiver stage 19 and a synchronizing and scanning stage 21 coupled thereto. The second signal source 13 embodies a flying spot scanner tube 23, a film holder 25 substantially adjacent thereto, a signal transmitter stage 27 closely associated with the film holder 25, and a signal processing stage 29 coupled to the signal transmitter stage 27.

As to the provision of a color image display derived from both color television signals and photographic films, the signal receiver stage 19 of the first signal source 9 derives signals representative of luminance and chrominance information from intercepted color television signals and applies these derived signals to the switching means 15. The second signal source 13 in cooperation with the film transport means 17 derives signals representative of luminance and chrominance information from the photographic film and applies these derived signals to the switching means 15. In turn, the switching means 15 selectively couples these applied signals representative of luminance and chrominance information to the color image reproducer 11 of the color television receiver 8 to provide a visual image display.

Also, the synchronizing and scanning stage 21 of the first signal source 9 responds to the signal receiver stage 19 to cause development of synchronizing and scanning signals in response to color television signals. The transport means 17 effects conveyance of a photographic film through the second source of signals 13 and development of synchronizing and scanning signals which are selectively applied to the synchronizing and scanning stage 21. These selected synchronizing and scanning signals of the synchronizing and scanning stage 21 are, in turn, applied to the color image reproducer 11 and to the flying spot scanner tube 23 to effect electron beam deflection and scanning thereof.

In operation, a color television signal intercepted by the first source of signals 9 provides luminance and chrominance information which is applied via a switching means 15 to the color image reproducer 11. Also, synchronizing and scanning signals derived from the intercepted color television signals are applied via the synchronizing and scanning signal stage 21 to the color image reproducer 11 to effect a color image display.

Alternatively, a color image display derived from photographic film is effected by activation of the transport means 17 and the second source of signals 13. The transport means effects conveyance of a film through the second source of signals 13 to provide signals representative of luminance and chrominance information which are selectively applied to the color image reproducer 11 via the switching means 15. Also, the transport means 17 causes development and application of signals to the synchronizing and scanning stage 21 of the first signal source 9 which, in turn, effects synchronization of electron beam scanning of the color image reproducer 11 and flying spot scanner tube 23 with respect to film conveyance through the second source of signals 13.

Thus, the first source of signals 9, the color image reproducer 11, and the switching means 15 are employed to effect a color image display derived from color television signals. Moreover, the first and second source of signals 9 and 13, the switching means 15, the transport means 17, and the color image reproducer 11 are employed to effect a color image display derived from photographic film.

Further, the switching means 15 causes selective application to the color image reproducer 11 of signals representative of luminance and chrominance information available from the first and second signal sources 9 and 13. Also, the synchronizing and scanning stage 21 of the first signal source 9 selectively responds to synchronizing information derived from color television signals and from the transport means 17 to effect synchronization of electron beam scanning of the color image reproducer 11 and flying spot scanner tube 23 and conveyance of a film through the second source of signals 13.

Figure 2:
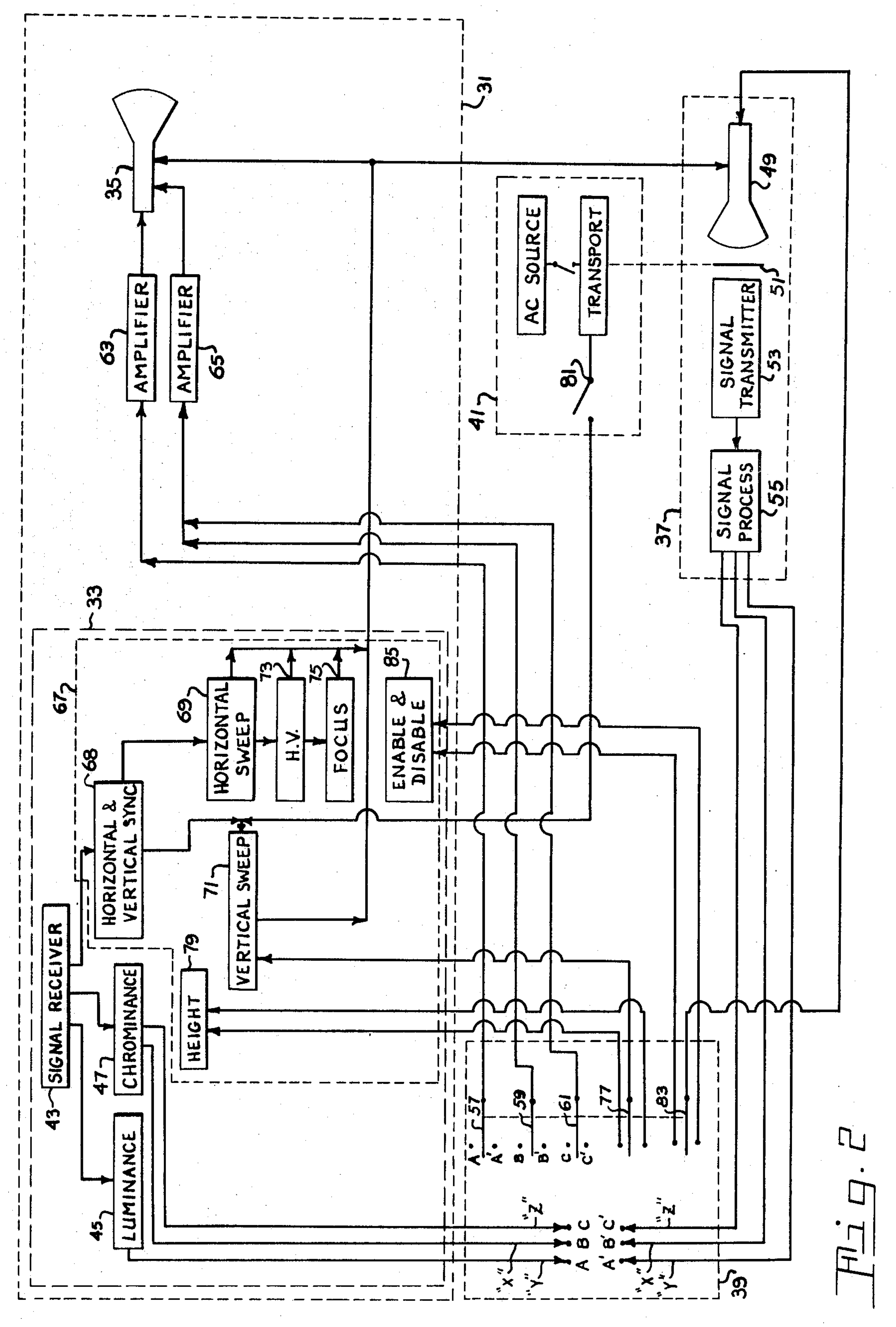
FIG. 2 is a block diagram of a preferred form of color image display system.

As a specific illustration of one preferred form of color image display system, reference is made to the diagrammatic illustration of FIG. 2. This color image display system includes a color television receiver 31 having a first source of signals 33 and a color image reproducer 35 and a second source of signals 37. A switching means 39 and a transport means 41 serve to selectively interconnect the first and second signal sources 33 and 37.

The first source of signals 33 of the color television receiver 31 includes a signal receiver stage 43 having the usual RF and IF amplification and detection stages commonly employed in the ordinary color television receiver. In the normal manner, a luminance channel 45 and a chrominance channel 47 are coupled to the signal receiver stage 43 to effect development of signals representative of luminance information or "Y" signals and signals representative of chrominance information or "X and Z" signals. These signals, "Y, X and Z", are applied to a plurality of contacts A, B, and C of the switching means 39.

The second source of signals 37 includes a flying spot scanner tube 49 which provides a scanning light beam. This light beam is directed onto a photographic film disposed within the film holder 51 to provide signals in the signal transmitter and process stages 53 and 55 representative of luminance or "Y" and chrominance "X and Z" information which, in turn, are applied to a plurality of contacts A', B', and C' of the switching means 39.

In addition to the contacts A, B, C and A', B', C', the switching means 39 includes a plurality of ganged and positionally alterable arms 57, 59 and 61 respectively. Each of these alterable arms is associated with one of the contact pairs A–A'; B–B'; and C–C'. Also, each one of the alterable arms 57, 59 and 61 is coupled by way of one of a pair of amplifier stages 63 and 65 to the color image reproducer 35.

Thus, signals representative of luminance and chrominance information derived from color television signals are available at the contacts A, B, and C. Signals representative of luminance and chrominance information derived from photographic film are available at the contacts A', B', and C'. Moreover, these signals are derived from the first and second signal sources 33 and 37 and applied to the contacts A, B, and C and A', B', and C'. Then, the switching means 39 selectively applies the signals to the color image reproducer 35 to provide a color image display derived from color television signals or photographic film. Obviously, color difference signals, as well as signals representative of the colors red, green and blue, are equally applicable and appropriate.

As to the synchronization, the first source of signals 33 includes the signal receiver stage 43 wherein signals derived from intercepted color television signals are applied to a synchronizing and scanning system 67. This synchronizing and scanning system 67 includes a horizontal and vertical synchronizing stage 68 wherefrom synchronizing signals at a horizontal deflection frequency are applied to a horizontal sweep stage 69 and synchronizing signals at a vertical deflection frequency are applied to a vertical sweep stage 71.

The horizontal sweep stage 69 is coupled to a high voltage stage 73 which is, in turn, coupled to a focus voltage stage 75. All of the stages, the horizontal sweep stage 69, the high voltage stage 73, and the focus voltage stage 75 are coupled to the color image reproducer 35 of the color television receiver 31 and to the flying spot scanner tube 49 of the second signal source 37.

The vertical sweep stage 71 is also coupled to the color image reproducer 35 of the color television receiver 31 and to the flying spot scanner tube 49 of the second signal source 37. Further, the vertical sweep stage 71 is coupled to a second positionally alterable switching means 77 selectively connectable to a vertical height control stage 79 of the synchronizing and scanning system 67. This second alterable switching means 77 is ganged to the switching means 39 and serves to provide alteration in the height of vertical scanning of the color image reproducer 33 and the flying spot scanner tube 49 in accordance with the positional location of the switching means 39. As the switching means 39 selects luminance and chrominance signals from the first and second signal sources 33 and 37, the second switching means 77 serves to effect alterations in the vertical scan height of the color image reproducer 35 and the flying spot scanner tube 49.

The vertical sweep stage 71 is also coupled to the transport means 41 which, in turn, is connected to the second source of signals 37. The transport means 41 includes a means for effecting conveyance of a photographic film through the film holder 51 of the second signal source 37 and means for developing synchronizing signals in accordance with the rate of photographic film conveyance as will be explained hereinafter.

These synchronizing signals developed in the transport means 41 are applied via a third switching means 81 to the vertical sweep circuitry 71. In turn, the signals from the vertical sweep circuitry 71 are applied to and control the vertical electron beam scanning of the color image reproducer 35 and the flying spot scanner tube 49.

Additionally, a fourth switching means 83 couples the flying spot scanner tube 49 of the second signal source 37 to an enablement and disablement stage 85 of the first signal source 33. This fourth switching means 83 is ganged to the switching means 39 and operates in conjunction therewith to effect selective enablement and disablement of the flying spot scanner tube 49 in accordance with selected operation of the first and second signal sources 33 and 37. In other words, the flying spot scanner tube 49 is disabled when the first signal source 33 is operative and enabled when the second signal source 37 is operative.

Figure 3:
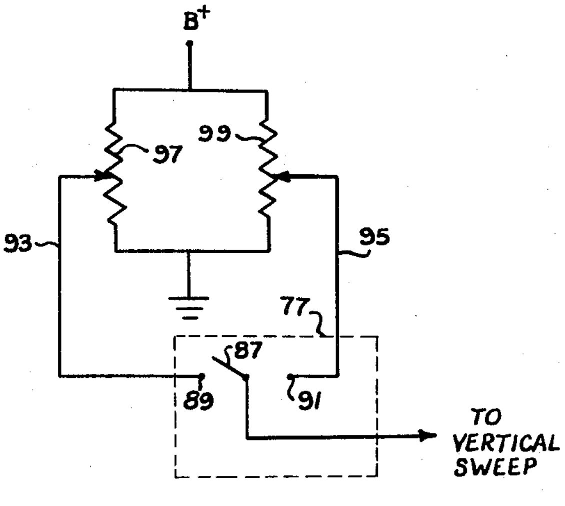
FIG. 3 is a schematic illustration of a vertical height control means suitable to the apparatus of FIG. 1.

Referring to examples of specific apparatus suitable to the above-described preferred form of color image display system, FIG. 3 illustrates one form of second switching means 77 and the vertical height control stage 79. Herein, the second switching means 77 is ganged to the switching means 39 for effecting alteration in vertical scanning height of the color image reproducer 35 and the flying spot scanner tube 49 in accordance with signals derived from either the first or second signal sources 33 and 37.

More specifically, the second switching means 77 includes a positionally alterable arm 87 coupled to the vertical sweep stage 71 of the first signal source 33 and to the color image reproducer 35. The second switching means 77 has a pair of contacts 89 and 91 each of which is connected to one of a pair of adjustable arms 93 and 95 of a pair of resistors 97 and 99. The resistors 97 and 99 are connected in parallel intermediate a potential source B+ and a potential reference level such as circuit ground.

In operation, the adjustable arms 93 and 95 are positioned to provide a desired potential at the contacts 89 and 91. In turn, this potential is applied to the vertical sweep stage 71 by selective positioning of the alterable arm 87 to cause variations in the vertical scan height of the color image reproducer 35 and the flying spot scanner tube 49.

Thus, vertical scan height of the color image reproducer 35 and the flying spot scanner tube 49 is altered in accordance with the selected position of the second switching means 77. This second switching means 77 is, in turn, ganged to and operable with the switching means 39 selecting signals from either the first or second signal sources 33 and 37.

Figure 5:
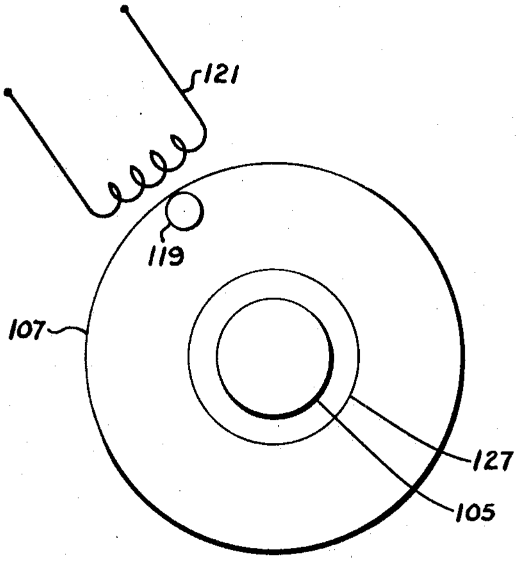
FIG. 5 is a sectional plan view of the transport means of FIG. 4.
Figure 4:
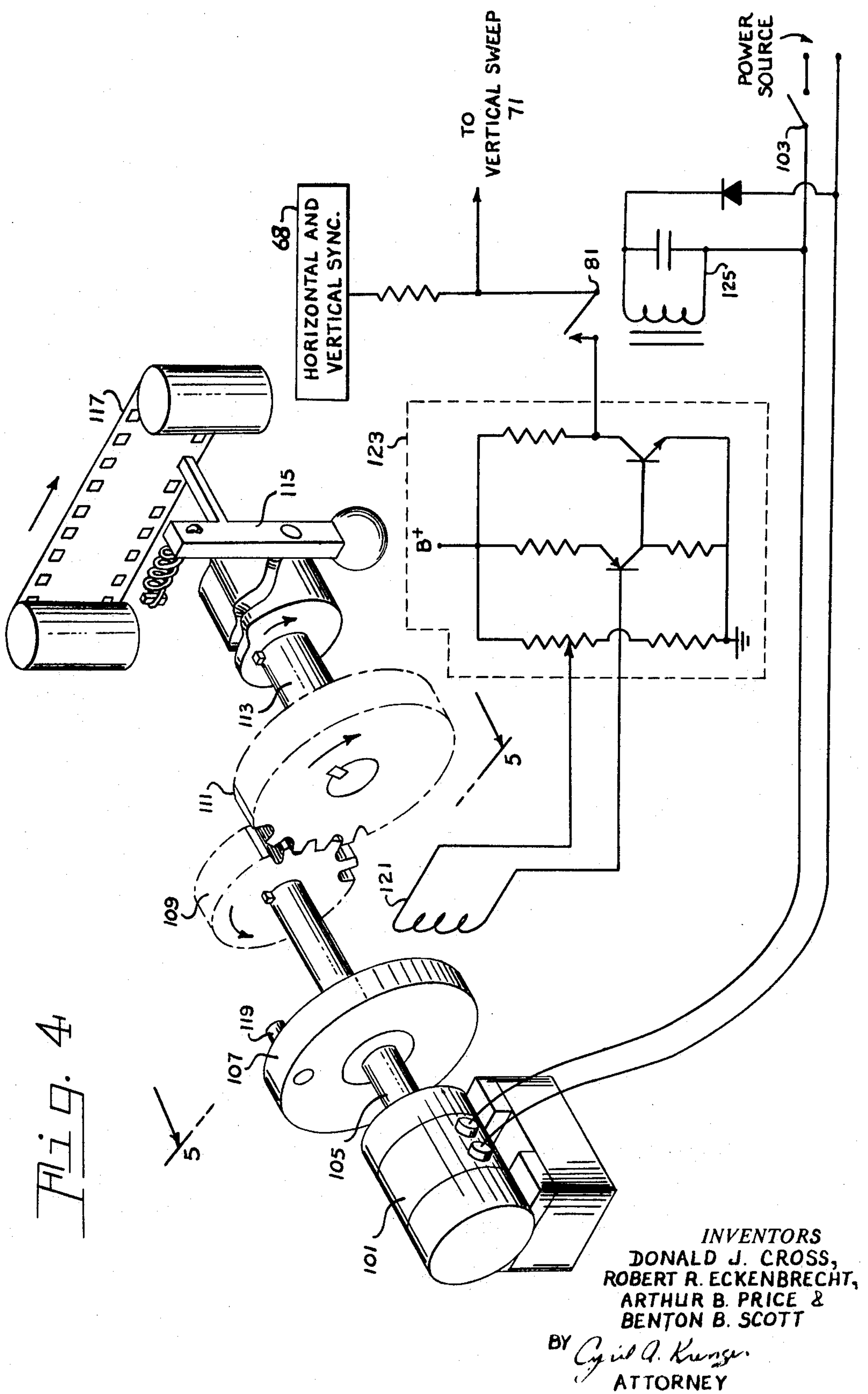
FIG. 4 is a preferred form of transport means suitable to the apparatus of FIG. 1.

Additionally, a preferred form of transport means 41 is illustrated in FIGS. 4 and 5. The transport means 41 includes a synchronous motor 101, coupled by an ordinary activating switch 103 to a power source. The synchronous motor 101 has an extending shaft member 105 to which is affixed a flywheel 107 and a gear member 109. A second gear member 111 is mechanically coupled to the gear number 109 and affixed to a connecting rod 113 coupled to a claw member 115 formed and disposed to effect movement of a photographic film 117.

The flywheel 107 has a permanent magnet 119 affixed thereto and a pickup coil 121 disposed immediately adjacent thereto in magnetic coupling arrangement with the permanent magnet 119. An amplifier stage 123 adjustably couples the pickup coil 121 to the third switching means 81, which, in turn, couples synchronizing signals from the pickup coil 121 to the vertical sweep stage 71 of the synchronizing and scanning system 67. This third switching means 81 includes a solenoid 125 which serves to cause application of synchronizing signals to the vertical sweep stage 71 from the transport means 41 whenever the activation switch 103 is energized.

In the sectional plan view of FIG. 5, taken along the line 5—5 of FIG. 4, the flywheel 107 is affixed to the shaft member 105 by means of a resilient pressure deformable bushing 127. This bushing 127, which is preferably of rubber material for instance, has compliance sufficient to insure development of a synchronizing signal of substantially stable and constant frequency by the permanent magnet 119 and pickup coil 121. Thus, the resilient bushing 127 has compliance sufficient to compensate for variations in loading of the flywheel 107 caused by the intermittent contacting relationship of the film 117 and claw member 115.

As to the operation, closing the activating switch 103 energizes the solenoid 125 activating the third switch 81 coupling the amplifier stage 123 to the vertical sweep stage 71. Also, the synchronous motor 101 is energized causing rotation of the shaft member 105, flywheel 107, gear member 109, and permanent magnet 119 to provide a vertical synchronizing signal at a frequency of about 60 cycles per second. Thus, a synchronizing signal of about sixty cycles per second is applied to the vertical sweep stage 71 to effect vertical scanning of the color image reproducer 33 and the flying spot scanner tube 49.

Further, the first and second gear members 109 and 111 are mechanically coupled to effect activation of the claw member 115 and movement of the film 117 in synchronization with the developed vertical synchronizing signal. Also, the rate of film movement is dependent upon the mechanical coupling of the gear members 109 and 111 and the rate of developed vertical synchronizing signals. Preferably, the film 117 is moved at a rate of about 20 frames per second with the movement synchronized to occur at a period other than the observable vertical trace period of the color image reproducer 35 and the flying spot scanner tube 49.

Additionally, it may be noted that the rotor of the synchronous motor 101 has a relatively low mass which would tend to cause so-called "bounce" when load changes are applied to the motor 101. In other words, intermittent loading such as the contacting relationship of the claw member 115 and the film 117 causes momentary overrunning and slippage of the motor 101 which would be reflected in variation in rotational speed of the flywheel 107, variations in the developed vertical synchronizing signal, and variations in the vertical scanning of the color image reproducer 35 and flying spot scanner tube 49.

However, all of the above-listed variations are substantially eliminated by inclusion of the resilient bushing 127 intermittent the shaft member 105 and the flywheel 107. As the non-uniform load of the contacting claw member 115 and film 117 is applied to the shaft member 105 tending to cause a slowing down thereof, the compliance of the bushing 127 tends to cause the rotational speed of the flywheel 107 to remain substantially constant. Thus, the developed vertical synchronizing signal and vertical scan of the color image reproducer 35 and flying spot scanner tube 49 remain substantially unchanged despite the variations in loading of the synchronous motor 101 by intermittent movement of the film 117.

At this point it should perhaps be noted that known consumer type apparatus for conveying film has a film movement or pull-down time in the range of about 5.5 to 7.0 milliseconds with a practical modified limit of about 3.5 milliseconds, while the vertical retrace period of a normal color television receiver lasts about 1.5 milliseconds. Thus, it can be seen that the vertical retrace period of a color television receiver is insufficient to hide the movement of a photographic film by known film conveying apparatus. Accordingly, the viewer of a color image display would normally be subjected to undesired and annoying film movement when viewing a color image display derived from photographic film on a color image reproducer.

Figure 6:
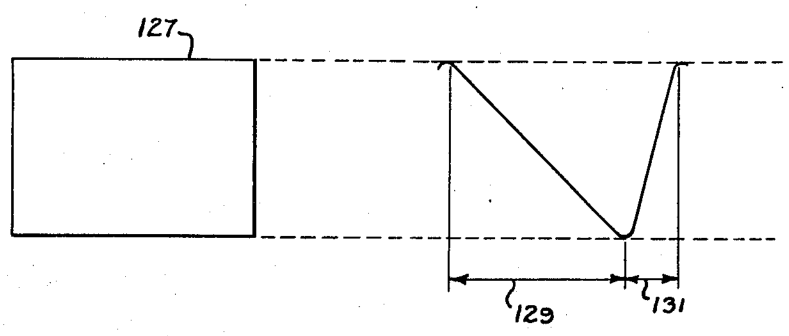
FIGS. 6 and 7 are comparative diagrams illustrating normal and overscan conditions of a color image reproducer.
Figure 7:
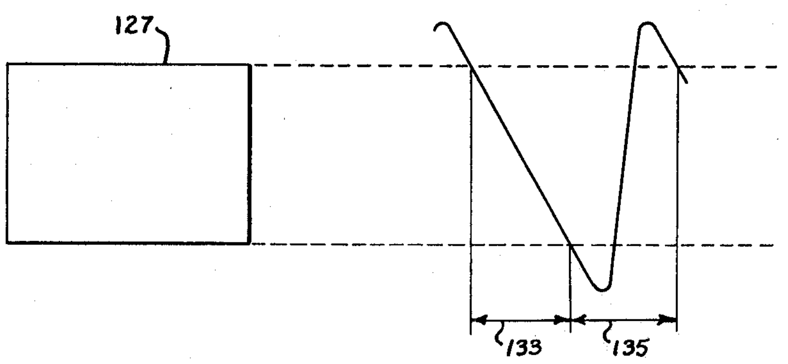

However, a preferred technique for substantially eliminating undesired and annoying observation of film movement when the film is displayed on a color television receiver is illustrated in the exaggerated diagrams of FIGS. 6 and 7. FIG. 6 illustrates a normal color image reproducer 127 having a normal vertical scan or trace period 129 and a normal retrace period 131. In the normal manner of color television receivers, a color image display is provided during the trace period 129 and the image reproducer 127 is blanked during the retrace period 131. Also, the normal vertical retrace period 131, in accordance with NTSC standards, is about 1 ½ milliseconds which is insufficient for film movement which requires a period of about 4 to 7 milliseconds.

In FIG. 7, the color image reproducer 127 has been altered to provide a vertical overscan condition with a vertical scan or trace period 133 and a combined overscan and retrace period 135. Thus, it can be seen that the combined overscan and retrace period 135 provides an increased time period sufficient to effect movement of the film at a period other than the scan or trace period and unobservable to a viewer. Moreover, this alteration in vertical scanning is readily effected with the above-described apparatus of FIG. 3.

In operation of the color image display system, a viewer provides a color image display derived from color television signals by selected positioning of the switching means 39 into connection with the contacts A, B, and C. Thereupon, luminance and chrominance information derived from the first source of signals 33 is applied via the switching means 39 to the color image reproducer 35. Also, horizontal and vertical scanning potentials derived from the horizontal and vertical scanning system 67 are applied to the color image reproducer 35. Further, the second switching means 77 effects a pre-determined vertical scanning height of the color image reproducer 35 while the fourth switching means 83 serves to disable the flying spot scanner tube 49. Thus, luminance and chrominance information, as well as scanning information having a pre-determined vertical magnitude are applied to the color image reproducer 35 to provide a color image display derived from color television signals.

Should the viewer desire a color image display derived from photographic film, the switching means 39 is positionally altered to provide connection with contacts A', B', and C'. Thereupon, the flying spot scanner tube 49 is activated, by operation of the fourth switching means 83 coupling the enablement stage 85 thereto, causing development of luminance and chrominance signals. Also, the light stage 79 is altered by operation of the second switching means 77 whereupon "still" film viewing is available to a viewer.

Upon activation of the transport means 41, a photographic film is conveyed through the film holder 51, preferably at the rate of about 20 frames per second, and vertical synchronizing signals at the rate of about 60 cycles per second are developed in the transport means 41. Also, the switching means 81 is activated whereupon the vertical synchronizing signals developed in the transport means 41 override the vertical synchronizing signals available from a received television signal and are applied to the vertical sweep stage 71. In this manner film conveyance and vertical scanning are synchronized since both are activated from the transport means 41.

Thus, luminance and chrominance signals derived from photographic film are applied via the switching means 39 to the color image reproducer 35. Also, a vertical synchronizing signal developed by the transport means 41 is applied to and controls the operation of the vertical sweep stages 71. Moreover, the second switching means 77 causes alteration in the magnitude of the vertical scan of the color image reproducer 35 whereby movement of the photographic film is accomplished at a period other than the vertical trace period observable to a viewer of the color image reproducer 35.

Thus, there has been provided a unique system for displaying color images derived from photographic films and from color television signals. The system provides synchronized vertical scanning of a color image reproducer and movement of a photographic film through a signal source in a manner such that a viewer of the color image reproducer is not disturbed or annoyed by undesired and observable film movement. Moreover, the system is uniquely adapted to a "consumer" type product which is relatively economical and uncomplicated when compared with known "commercial" type products.

Additionally, the system has been shown in a form which includes the development and switching of so-called "Y and X, Z" signals, although it is obvious that the development and switching of signals representative of the colors red, green and blue is equally applicable and appropriate. Thus, color image displays selectively derived from color television signals and photographic films have been provided.

While there has been shown and described what is at present considered the preferred embodiments of the invention, it will be understood that various changes and modifications may be made therein without departing from the invention as defined by the appended claims.

We claim:

1. Load compensating apparatus comprising in combination:
   a power source;
   motor means including a shaft member, said means coupled to said power source;
   non-uniform loading means coupled to said motor means tending to cause a non-uniform rotational speed thereof;
   a flywheel; and
   compliance means in the form of a bushing of resilient material coupling said flywheel to said shaft member of said motor means whereby non-uniform loading tending to cause non-uniform rotational speed of said motor means is compensated for by said compliance means to effect substantially uniform rotational speed of said flywheel.

2. The combination of claim 1 wherein said compliance means is in the form of a rubber bushing.

3. The combination of claim 1 including a permanent magnet affixed to said flywheel and a pickup coil in intermittent magnetic relationship to said permanent magnet.

4. Film conveyance and synchronizing signal development apparatus comprising in combination:
   a power source;
   a first gear member;
   motor means coupled to said power source for effecting rotation of said first gear member;
   means coupled to said first gear member for effecting intermittent movement of a photographic film; and
   means coupled to said motor means for effecting a stable synchronizing signal, said means including a flywheel, a permanent magnet affixed to the flywheel, a pickup coil adjacent the flywheel, and compliance means in the form of a bushing of resilient material affixing said flywheel to said motor means whereby non-uniform loading tending to cause non-uniform rotational speed of said motor means and said flywheel is compensated for by said compliance means to provide a stable rotational speed of said flywheel developing a stable synchronizing signal.

5. The combination of claim 4 wherein said means coupled to said first gear member includes a second gear member coupled to said first gear member and connected to a claw member disposed for intermittent contact with a photographic film.

6. The combination of claim 4 wherein said compliance means is in the form of a rubber bushing affixing said flywheel to said motor means.

7. The combination of claim 5 wherein said first and second gear members have a ratio of about 3 to 1 whereby the rate of movement of said claw member is about one-third the rate of movement of said flywheel.

* * * * *